Sept. 21, 1954
G. S. PARK
2,689,764
VEHICLE EXTENSION FOR MOUNTING LIFT-GATE ASSEMBLIES
Filed June 11, 1949
2 Sheets-Sheet 1

Inventor
Glenn S. Park
by Parker & Carter
Attorneys.

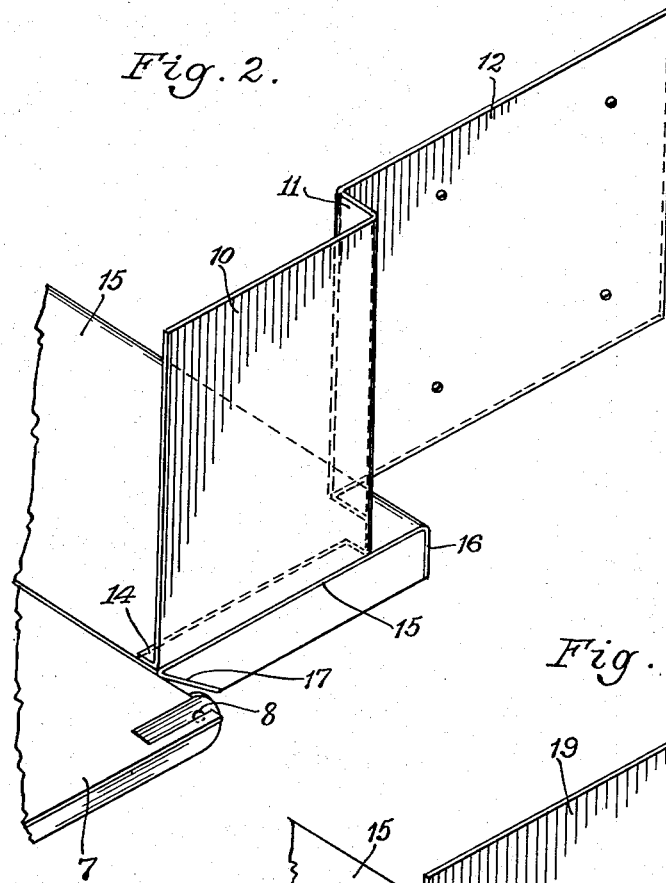
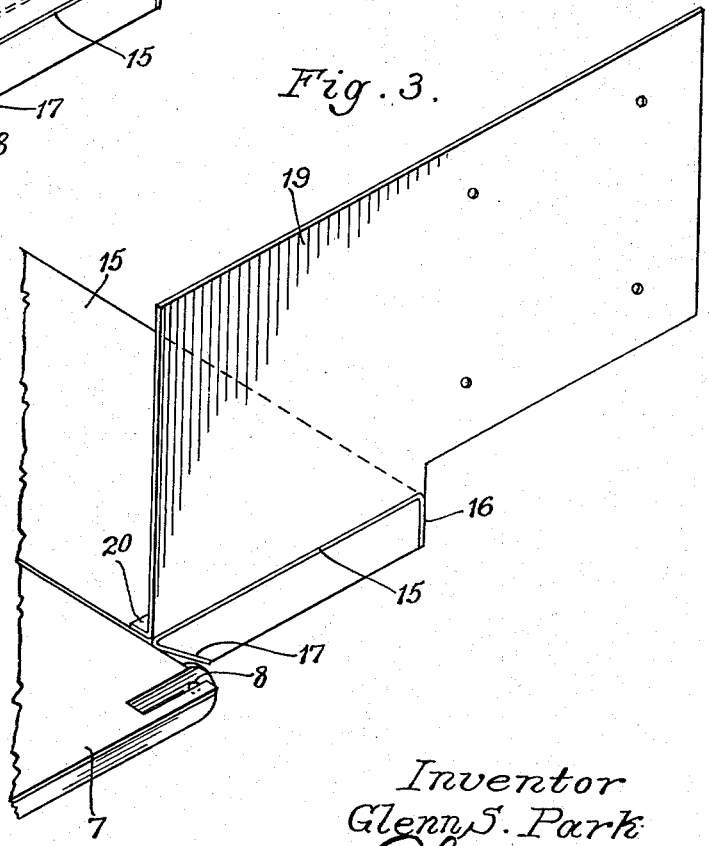

Patented Sept. 21, 1954

2,689,764

UNITED STATES PATENT OFFICE 2,689,764

VEHICLE EXTENSION FOR MOUNTING LIFT-GATE ASSEMBLIES

Glenn S. Park, Streator, Ill., assignor to Anthony Company, Streator, Ill., a corporation of Illinois Application June 11, 1949, Serial No. 98,475

3 Claims. (Cl. 296—28)

This invention relates to mounting and adapting means whereby a platform, and elevating or lifting means for the platform may be mounted upon vehicles or other supports of varying sizes. The platform comprises a load carrying member which may also serve as the tail gate of a vehicle. Means are provided for raising and lowering the platform. It is convenient to make this assembly of a standard size. Since it is to be mounted upon trucks or other supports of varying sizes, it is one object of the present invention to provide means whereby the lifting assembly of standard or fixed size may be readily mounted upon trucks or platforms of different sizes.

Another object of the invention is to provide adapting means for securing an assembly of standard size in suitable position upon supports of different sizes.

Other objects will appear from time to time throughout the specification and claims.

Figure 2 is a perspective view illustrating the device separate from a vehicle.

Figure 3 is a view similar to Figure 2 illustrating a modified form of the device.

Like parts are indicated by like characters throughout the specification and the drawings.

Figure 1:
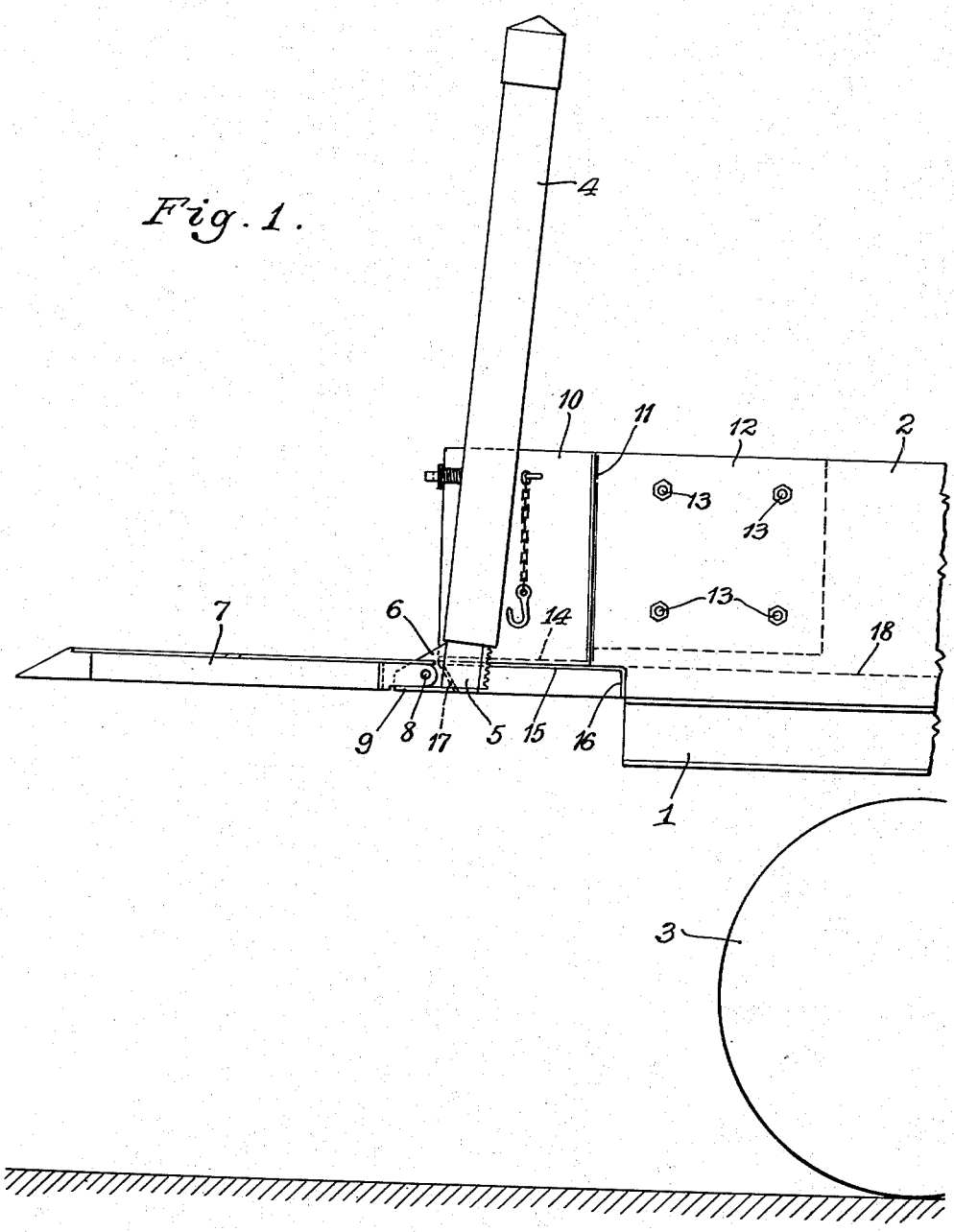
Figure 1 is a side elevation of one form of the device in position on a vehicle.

In the particular form here shown, the invention is illustrated as mounted upon a truck body. Only so much of the truck is shown as is necessary for an understanding of the device.

A truck frame 1 carries a truck body. A side wall 2 of that body is indicated in Figure 1. Running gear 3 is illustrated diagrammatically in Figure 1. One or more lifting members are included in the assembly. These lifting members include fixed portions 4 and downwardly movable portions 5. Each of the portions 5 carries a member 6 upon which a load carrying gate-like member 7 is pivoted as at 8. A stop 9 on the member 6 limits downward movement of the platform 7 but permits it to be sprung from the position of Figure 1 to a vertical position in which it may act as a tail gate for closing the end of the truck or vehicle upon which the device is mounted.

The members 4 are fixed to side members 10. These members, as shown in Figures 1 and 2, may be inwardly bent as at 11 to provide an offset portion 12. Ordinarily two such members will be used, one on each side of the vehicle body. The offset portions 12 are secured to the side walls of the vehicle by bolts 13 or otherwise. As shown in Figure 2 the portion 10 is provided with a flange 14 which is secured to a transverse floor member 15. This member may be conveniently shaped for rigidity by the formation of a flange 16 and a second flange 17 on opposite edges respectively. When mounted in a vehicle the parts are so positioned that the upper surface of the member 15 is in line with the upper surface 18 of the floor of the fixed vehicle body. The portions 10 thus furnish, in effect, rearward extensions of the side walls of the vehicle body and the member 15 furnishes a rearward extension of the floor of the vehicle body.

In the modification of Figure 3 a member 19 is substituted for the member 10, 12. As shown in Figure 3, this member is generally plain and without any bent or offset portion corresponding to the bend 11 of Figure 2. A flange 20 is formed on the member 19 or on the portion of that member which overlies the member 15. In either case the side members, that is to say the members 10 or 19, are secured to the transverse member 15 by bolting, riveting or otherwise and the side members and the transverse member form, in effect, a rearward extension of the vehicle body of substantially the same width as the body. By utilizing the side member 10, 12 the device may be attached to a truck body of relatively narrow dimensions. By utilizing the side member 19 of Figure 3 the device may be attached to a relatively wider truck body. The side members of Figure 2 may be made in different sizes, the size of the bent portion 11 being varied to give a greater or less degree of offset between the members 10 and 12. The bent portion 11 may be directed in a direction opposite to that shown in Figure 2 and when so directed, the offset portion 12 will be laterally outside of the offset portion 10. By providing side members as shown in Figure 3, or as shown in Figure 2, and by varying the size and direction of the bent portion 11 of Figure 2, the device can be made readily adaptable to a wide variation of truck body sizes. In all cases the distance between the portion of the side members which overlies the transverse member 15 is the same. Hence, the platform 7 and the lifting means for that platform are of standard dimension and the mounting or adapting means comprising the transverse member 15 and the side members 12 and 19 accomplish the necessary variation in width to permit the mounting of the elevating mechanism upon trucks irrespective of their width. Thus, by providing in effect an extension for attachment to a body and by providing in that extension a main portion of fixed width and auxiliary portions of variable width, the device as a whole may be readily mounted upon a wide variety of sizes of truck bodies or other supports.

Although I have shown an operative form of my invention, it will be recognized that many changes in the form, shape and arrangement of parts can be made without departing from the spirit of the invention, and my showing is therefore to be taken as, in a sense, diagrammatic.

The use and operation of this invention are as follows:

In practice it may be assumed that the width of truck bodies, as normally available in the market, will not vary between large limits. When the device is to be installed the size of the body to which it is to be attached is known. Side members will then be selected suitable for the particular body. If the width of the body is substantially the same as the width of the member 15, the side member 19 as shown in Figure 3 will be used. If the width of the body is less than that of the member 15 the side member as shown in Figure 2 will be used. These members will be formed with a greater or less degree offset so that the parts 12 are positioned to engage the side walls of the body. The size of the bend 11 and its direction, inwardly or outwardly, are thus determined so that the member 12 may be fastened to the truck body and will lie flush against it and form, in effect, a smooth extension of it. The side members of whatever size or shape may have been determined are secured to the side walls of the truck body, and the hoisting or raising mechanism is secured also to the side members.

The transverse member 15 is fastened in place, being joined to the side members by the flanges which each of them carries and if desired, the flange 16 of the transverse member 15 is secured to the body floor already present in the truck body. With the parts so fastened in place the assembly is mounted, as shown in Figure 1, and the elevating assembly is properly attached to and supported from the truck body. Whatever the width of the truck body is in relation to the standard width of the platform 7, those parts of the side members which overlie the truck body are joined to the transverse member 15.

I claim:

1. In combination, in a mounting means adapted for mounting a mechanism upon a vehicle body having a floor and sides, a unitary, horizontally disposed base member of fixed length, and a plurality of side members, said side members each including portions adapted to be attached to said base member at predetermined fixed points, said side members including extensions adapted to be joined to a vehicle body, said extensions being laterally offset from said forward portions, said base member being shaped and adapted to form an extension of said floor and said side members being shaped and adapted to form extensions of said sides.

2. In combination, in a mounting means adapted for mounting a mechanism on a vehicle body, a single unitary base member, and a plurality of side members, said side members each including portions adapted to be attached to said base member at predetermined fixed points, said side members including extensions adapted to be joined to a vehicle body, said extensions being laterally offset from said forward positions, said base part being shaped and adapted to be attached to said side members to form a continuation of the floor of said vehicle body.

3. In combination, in a mounting means adapted for mounting a mechanism upon a vehicle body having a floor and sides, a unitary horizontally disposed base member of fixed length, and a plurality of side members, said side members being vertically disposed and each including forward portions adapted to be attached to said base member at predetermined fixed points, said side members including extensions adapted to be joined to a vehicle body substantially flush with its sides, said extensions being laterally offset from said forward portions, said base member being shaped and adapted to form an extension of said floor, said side members being shaped and adapted to form extensions of said sides beyond the point of said offset.

References Cited in the file of this patent

UNITED STATES PATENTS

| Number | Name | Date |
|---|---|---|
| 808,395 | Luscombe | Dec. 26, 1905 |
| 874,525 | McGranor et al. | Dec. 24, 1907 |
| 999,163 | Hall et al. | July 25, 1911 |
| 1,629,403 | Marwahn | May 17, 1927 |
| 2,203,310 | Shonnard | June 4, 1940 |
| 2,236,317 | Howland | Mar. 25, 1941 |
| 2,418,494 | Anthony et al. | Apr. 8, 1947 |
| 2,451,656 | Birch | Oct. 19, 1948 |
| 2,536,080 | Patton | Jan. 2, 1951 |
| 2,556,101 | Negin et al. | June 5, 1951 |
| 2,581,333 | Vawter | Jan. 1, 1952 |

FOREIGN PATENTS

| Number | Country | Date |
|---|---|---|
| 644,065 | France | May 26, 1928 |